US012353698B2

(12) United States Patent
Chang et al.

(10) Patent No.: US 12,353,698 B2
(45) Date of Patent: Jul. 8, 2025

(54) INTERACTION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Weiyi Chang, Beijing (CN); Ziyang Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/393,350

(22) Filed: Dec. 21, 2023

(65) Prior Publication Data

US 2024/0134512 A1 Apr. 25, 2024

Related U.S. Application Data

(63) Continuation of application No. PCT/CN2022/131140, filed on Nov. 10, 2022.

(30) Foreign Application Priority Data

Nov. 25, 2021 (CN) .......................... 202111412228.8

(51) Int. Cl.
*G06F 3/04847* (2022.01)
*G06F 3/0488* (2022.01)
(Continued)

(52) U.S. Cl.
CPC ........ *G06F 3/04847* (2013.01); *G06F 3/0488* (2013.01); *H04N 21/4312* (2013.01); *H04N 21/6587* (2013.01)

(58) Field of Classification Search
CPC .............. G06F 3/04847; G06F 3/0488; H04N 21/4312; H04N 21/6587
(Continued)

(56) References Cited

U.S. PATENT DOCUMENTS 8,533,599 B2 * 9/2013 Son ...................... G06F 3/04883
715/863
9,753,632 B2 * 9/2017 Choi ....................... G06F 3/017
(Continued)

FOREIGN PATENT DOCUMENTS

| CN | 110427143 A | 11/2019 |
|---|---|---|
| CN | 111309225 A | 6/2020 |

(Continued)

OTHER PUBLICATIONS

Fruit is Love for Life (High Energy Responder), "How can I clear the Tiktok subtitles on my iPhone?", Sep. 13, 2020, Baidu Knows, 3 pages.
(Continued)

*Primary Examiner* — William D Titcomb
(74) *Attorney, Agent, or Firm* — Astute IP Law Group

(57) ABSTRACT

An interaction method, an interaction apparatus, an electronic device, and a storage medium are provided. The interaction method includes: displaying a target object in a first display mode on a target object display interface, where in the first display mode, the target object display interface includes a first interactive control; receiving a display mode switching on the target object display interface; and in response to the display mode switching, displaying the target object in a second display mode on the target object display interface, where in the second display mode, the target object display interface includes a second interactive control different from the first interactive control.

20 Claims, 10 Drawing Sheets

(51) Int. Cl.
*H04N 21/431* (2011.01)
*H04N 21/6587* (2011.01)

(58) Field of Classification Search
USPC ............................................. 715/722
See application file for complete search history.

(56) References Cited

U.S. PATENT DOCUMENTS

| | | | |
|---|---|---|---|
| 2006/0001650 A1* | 1/2006 | Robbins | G06F 3/0482 345/173 |
| 2010/0031162 A1 | 2/2010 | Wiser et al. | |
| 2010/0058253 A1* | 3/2010 | Son | G06F 3/04883 455/566 |
| 2012/0016935 A1* | 1/2012 | Huang | H04N 21/25841 709/226 |
| 2013/0155095 A1* | 6/2013 | Hussain | H04N 21/42224 345/619 |
| 2014/0123013 A1* | 5/2014 | Lee | H04M 1/72427 715/719 |
| 2014/0259074 A1* | 9/2014 | Ansari | H04N 21/4312 725/50 |
| 2015/0031417 A1* | 1/2015 | Lee | H04W 4/12 455/566 |
| 2015/0121229 A1* | 4/2015 | Wang | G06F 3/04886 715/728 |
| 2016/0124606 A1* | 5/2016 | Lim | G06F 3/0482 715/728 |
| 2017/0270965 A1 | 9/2017 | Bao et al. | |
| 2018/0242036 A1* | 8/2018 | Watanabe | H04N 21/4136 |
| 2018/0335901 A1 | 11/2018 | Manzari et al. | |
| 2019/0079787 A1 | 3/2019 | Toksoz et al. | |
| 2019/0361694 A1* | 11/2019 | Gordon | G06F 9/452 |
| 2019/0391710 A1 | 12/2019 | Lee et al. | |
| 2020/0366963 A1 | 11/2020 | Liao | |
| 2022/0342525 A1* | 10/2022 | Wang | G06F 3/01 |

FOREIGN PATENT DOCUMENTS

| | | |
|---|---|---|
| CN | 112272303 A | 1/2021 |
| CN | 112911368 A | 6/2021 |
| CN | 114077375 A | 2/2022 |
| JP | 2012168932 A | 9/2012 |
| JP | 2019511029 A | 4/2019 |
| JP | 7597457 B2 | 12/2024 |
| KR | 1020210135363 A | 11/2021 |
| WO | 2021082652 A1 | 5/2021 |

OTHER PUBLICATIONS

Office Action for Japanese Patent Application No. 2023-579294, mailed Jun. 18, 2024, 10 pages.
Office Action for Korean Patent Application No. 10-2023-7044540, mailed Jul. 3, 2024, 30 pages.
Examination Report No. 1 for Australian Patent Application No. 2022397628, mailed on Nov. 29, 2024, 3 Pages.
Extended European Search Report for European Patent Application No. 22897621.3, mailed on Oct. 4, 2024, 8 Pages.
Feng, Rui et al., "The Construction of Learning Social Networking Sites in the Perspective Connectionism"; Journal of Distance Education; Issue 3; Apr. 18, 2013; 7 pages (with English Abstract on p. 16).
International Search Report and Written Opinion for International Patent Application No. PCT/CN2022/131140, mailed on Jan. 6, 2023, 13 Pages.

* cited by examiner

INTERACTION METHOD AND APPARATUS, ELECTRONIC DEVICE, AND STORAGE MEDIUM

The present application is a continuation of International Patent Application No. PCT/CN2022/131140, filed on Nov. 10, 2022, which claims priority of Chinese Patent Application No. 202111412228.8, filed on Nov. 25, 2021, and the entire content disclosed by the Chinese patent application is incorporated herein by reference as part of the present application.

TECHNICAL FIELD

Embodiments of the present disclosure relate to an interaction method, an interaction apparatus, an electronic device, and a storage medium.

BACKGROUND

With the continuous development of network audio-visual technologies, videos have achieved rapid development as driven by network flow.

SUMMARY

At least one embodiment of the present disclosure provides an interaction method, and the method comprises: displaying a target object in a first display mode on a target object display interface, where in the first display mode, the target object display interface comprises a first interactive control; receiving a display mode switching on the target object display interface; and in response to the display mode switching, displaying the target object in a second display mode on the target object display interface, where in the second display mode, the target object display interface comprises a second interactive control different from the first interactive control.

At least one embodiment of the present disclosure further provides an interaction apparatus, and the interaction apparatus comprises a target object display unit, an operation receiving unit, and a display mode switching unit; the target object display unit is configured to display a target object in a first display mode on a target object display interface and display the target object in a second display mode on the target object display interface; in the first display mode, the target object display interface comprises a first interactive control, and in the second display mode, the target object display interface comprises a second interactive control, the first interactive control being different from the second interactive control; the operation receiving unit is configured to receive a display mode switching on the target object display interface; the display mode switching unit is configured to switch, in response to the display mode switching, from displaying the target object in the first display mode on the target object display interface to displaying the target object in the second display mode on the target object display interface.

At least one embodiment of the present disclosure further provides an electronic device, and the electronic device comprises a processor and a memory; the memory comprises one or more computer-executable instructions; the one or more computer-executable instructions are stored on the memory and configured to be executed by the processor; and the one or more computer-executable instructions are configured to implement the interaction method according to any one of the embodiments of the present disclosure.

At least one embodiment of the present disclosure further provides a storage medium, the storage medium is configured to store non-transitory computer-executable instructions, and the non-transitory computer-executable instructions, when executed by a processor, cause the processor to implement the interaction method according to any one of the embodiments of the present disclosure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
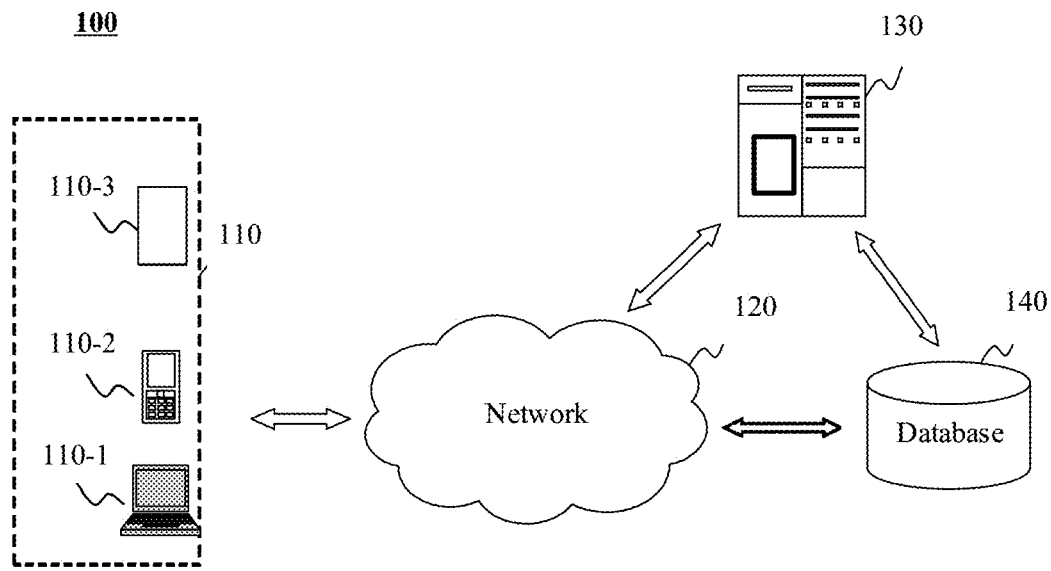
FIG. 1 illustrates a system for implementing an interaction method provided by an embodiment of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method implementations of the present disclosure may be performed in different orders and/or in parallel. Furthermore, the method implementations may include additional steps and/or omit performing the illustrated steps. The protection scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

At present, when users post or watch videos through video social software on mobile terminals (e.g., a mobile phone, a Pad, a laptop, etc.) or other electronic devices, social interaction may be realized between different users by means of the video social software. For example, a user may upload and post a produced video by means of the video social software, and may also watch videos posted by other users by means of the video social software and perform operations (e.g., "like," "comment," "forward," etc.) on the videos, thereby achieving social interaction with other users.

At least one embodiment of the present disclosure provides an interaction method, and the interaction method includes: displaying a target object in a first display mode on a target object display interface, where in the first display mode, the target object display interface includes a first interactive control; receiving a display mode switching on the target object display interface; and in response to the display mode switching, displaying the target object in a second display mode on the target object display interface, where in the second display mode, the target object display interface includes a second interactive control different from the first interactive control.

In the interaction method provided by the embodiments of the present disclosure, in different display modes, a target object display interface can respectively provide different interactive controls corresponding to respective current display modes, so as to perform interactive operations such as of different types, thereby facilitating meeting the diversified interaction requirements of users in different display modes.

Hereinafter, the embodiments of the present disclosure will be described in detail with reference to the accompanying drawings. It should be noted that the same reference numerals in different drawings will be used to refer to the same described elements.

FIG. 1 illustrates a system for implementing an interaction method provided by an embodiment of the present disclosure. As illustrated in FIG. 1, the system 100 may include a plurality of user terminals 110, a network 120, a server 130, and a database 140. For example, the system 100 may be configured to implement the interaction method according to any one of the embodiments of the present disclosure.

For example, the user terminal 110 may be a computer 110-1, a mobile phone 110-2, or a tablet computer 110-3. It should be understood that the user terminal 110 may be any other type of electronic devices capable of performing data processing, which may include but not be limited to a desktop computer, a laptop, a tablet computer, a smart phone, an intelligent home device, a wearable device, a vehicle-mounted electronic device, a monitoring device, etc. For example, the user terminal 110 may also be any equipment provided with an electronic device, such as a vehicle, a robot, or the like.

A user may operate through an application installed on the user terminal 110. The application transmits user behavior data to the server 130 via the network 120. The user terminal 110 may also receive the data transmitted by the server 130 via the network 120. The embodiments of the present disclosure do not impose limitations on the hardware system and software system of the user terminal 110. For example, the user terminal 110 may be a processor based on such as ARM, X86, or the like, the user terminal 110 may have input/output devices such as a camera, a touch screen, a microphone, or the like, and the user terminal 110 may run an operating system such as Windows, iOS, Linux, Android, HarmonyOS, etc.

For example, the application on the user terminal 110 may be a social application, e.g., a social application based on multimedia resources such as videos, pictures, live videos, etc. Taking the social application based on multimedia resources such as videos, pictures, live videos, or the like as an example, the user may perform online live broadcasting or upload and post videos, pictures, and the like through the social application on the user terminal 110, and the user may also watch or browse videos, pictures, live videos, or the like posted by other users and may perform operations, such as the "like," "comment," "forward," etc.

The user terminal 110 may implement the interaction method provided by the embodiments of the present disclosure by running processes or threads. In some examples, the user terminal 110 may utilize a built-in application thereof to implement the interaction method. In some other examples, the user terminal 110 may invoke an application stored externally to the user terminal 110 to implement the interaction method.

The network 120 may be a single network, or a combination of at least two different networks. For example, the network 120 may include but be not limited to a combination of one or more of a local area network, a wide area network, a public network, a private network, etc. The network 120 may be a computer network (such as Internet) and/or various telecommunication networks (e.g., 3G/4G/5G mobile communication networks, WIFI, Bluetooth, ZigBee, etc.), and the embodiments of the present disclosure are not limited in this aspect.

The server 130 may be an individual server or a server group or a cloud server. The servers in the server group are connected by a wired or wireless network. The server group may be centralized, e.g., a data center, and may also be distributed. The server 130 may be local or remote. The server 130 may communicate with the user terminal 110 via a wired or wireless network. The embodiments of the present disclosure do not impose limitations on the hardware system and software system of the server 130.

The database 140 may refer to a device with a storage function in general. The database 140 is mainly configured to store various data utilized, generated, and output by the user terminal 110 and the server 130 during operation. For example, taking the example that the application on the user terminal 110 is the social application based on multimedia resources such as videos, pictures, live videos, etc., data stored in the database 140 may include resource data (e.g., videos, pictures, etc.) uploaded by the user through the user terminal 110, and may also include interactive operation data, such as the "like," "comment," etc.

The database 140 may be local or remote. The database 140 may include various memories, such as a random access memory (RAM), a read only memory (ROM), etc. The storage devices mentioned above are some examples, and storage devices that can be used by the system 100 are not limited thereto. The embodiments of the present disclosure do not impose limitations on the hardware system and software system of the database 140. For example, a relational database or a non-relational database may be used.

The database 140 may be interconnected or communicate with the server 130 or a part of the server 130 via the network 120, or may be interconnected or communicate with the server 130 directly, or may be interconnected or communicate with the server 130 in a combination of the two manners.

In some examples, the database 140 may be an independent device. In some other examples, the database 140 may also be integrated into at least one of the user terminal 110 and the server 130. For example, the database 140 may be provided on the user terminal 110, or may also be provided on the server 130. For another example, the database 140 may also be distributed, and has one part set on the user terminal 110 and the other part set on the server 130.

Figure 2:
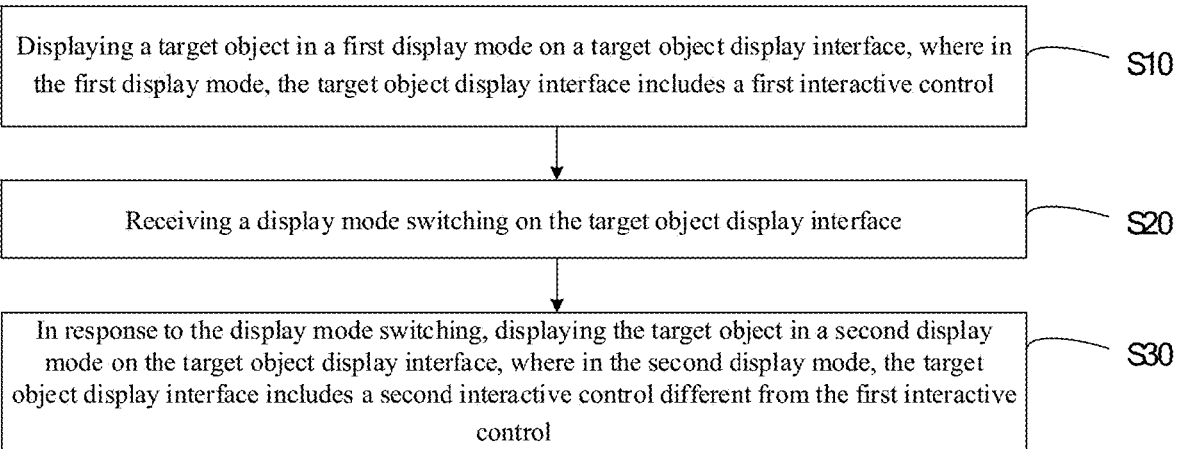
FIG. 2 is a schematic flowchart of an interaction method provided by some embodiments of the present disclosure.

FIG. 2 is a schematic flowchart of an interaction method provided by some embodiments of the present disclosure. The interaction method may be applied to the user terminal 110 in the system 100 shown in FIG. 1, for example, applied to the social application or software on the user terminal 110. The user can perform operations in an interactive interface provided by the social application or software on the user terminal 110.

As illustrated in FIG. 2, the interaction method provided by the embodiments of the present disclosure includes Step S10 to Step S30.

Step S10: displaying a target object in a first display mode on a target object display interface, where in the first display mode, the target object display interface includes a first interactive control.

Step S20: receiving a display mode switching on the target object display interface.

Step S30: in response to the display mode switching, displaying the target object in a second display mode on the target object display interface, where in the second display mode, the target object display interface includes a second interactive control different from the first interactive control.

For example, for Step S10 and Step S30, the target object may be a multimedia resource, such as a picture, a video, a live video, or the like. The target object display interface may be an interactive interface provided by the social application or software on the user terminal 110. The interactive interface may serve as a display interface to show visible information of the target object for the user (i.e., the user of the user terminal 110) and may also be configured to receive operations performed by the user in the interactive interface.

For example, taking the example that the user terminal 110 is a smart phone or a tablet computer, the target object display interface may occupy the whole display screen of the smart phone or the tablet computer. In other words, the target object display interface is the entire display interface of the smart phone or the tablet computer. For another example, taking the example that the user terminal 110 is a laptop, the target object display interface may occupy the whole display screen of the laptop, or may occupy part of the display screen of the laptop.

For example, taking the case that the target object is a video, the video may be played on the target object display interface, so as to allow the user to watch the video through the target object display interface. For another example, taking the case that the target object is a picture, one or more pictures may be displayed on the target object display interface, so as to allow the user to browse the respective pictures simultaneously or separately through the target object display interface.

For example, the first display mode and the second display mode are two different display modes. Here, different display modes may refer to different display manners or display modes of the target object on the target object display interface.

For example, the first display mode and the second display mode may be a normal display mode (i.e., a non-clear screen display mode) and a clear screen display mode, respectively. In the clear screen display mode, interactive controls on the target object display interface are all located within a region other than a display image region of the target object, so that a display image of the target object is not covered by the interactive controls, thereby allowing the user to obtain the whole image information of the target object more accurately and intuitively. Moreover, the display image region of the target object in the clear screen display mode remains unchanged. In the normal display mode, the interactive control on the target object display interface may be partially or completely located within the display image region of the target object. For example, in addition to the interactive control, the target object display interface may further include other data information related to the target object, thus being beneficial for the user rapidly obtaining related information about the target object and performing corresponding interactive operations. When the clear screen display mode is switched to the normal display mode or the normal display mode is switched to the clear screen display mode, the display image of the target object is played continuously.

For example, in the first display mode and the second display mode, attributes (such as a display scale and a display position) of the display image region of the target object on the target object display interface and features (such as a size ratio) of the display image of the target object may remain unchanged, so that display states of the target object in different display modes may keep stable, thus being conducive to avoiding potential adverse influence on the visual effect of the image in the display mode switching process, thereby optimizing the viewing experience of the user.

For example, in the process of switching from the first display mode to the second display mode or switching from the second display mode to the first display mode, the display state of the target object does not change. For example, taking the target object being a video as an example, in the display mode switching process, a playing state, a pause state, a playing rate, a playing volume, an image definition, and the like of the video do not change.

For another example, in the case of the video serving as the target object, the video may be played with different volumes in different display modes, respectively. For example, the first display mode and the second display mode may be a high-volume playing mode and a low-volume playing mode, respectively, or may also be a voiced playing mode or a muted playing mode, respectively. Alternatively, the video may be played with different image quality effects in different display modes, respectively. For example, the first display mode and the second display mode may be a high-definition image quality playing mode and a low-definition image quality playing mode.

For example, in the case of the target object being a plurality of pictures, a synchronous display manner of simultaneously displaying the plurality of pictures on the target object display interface and a single-picture display manner of displaying each one of the pictures in sequence on the target object display interface may be used in different display modes, respectively. Alternatively, the plurality of pictures may be played in an automatic continuous playing mode, a manual selection playing mode, and the like in different display modes, respectively.

It needs to be noted that the different display modes are described above merely as examples, and application scenarios of different display modes in the embodiments of the present disclosure include but are not limited thereto.

For example, for Step S10 and Step S30 described above, the first interactive control and the second interactive control may be configured to perform different interactive operations, respectively, so as to provide different interactive functions. For example, the first interactive control and the second interactive control may be configured to perform interactive operations of different types, so as to provide interactive functions of different types. In the first display mode, the target object display interface includes the first interactive control and does not include the second interactive control; and in the second display mode, the target object display interface includes the second interactive control and does not include the first interactive control. Thus, it is beneficial to achieve different interactive operations in the first display mode and the second display mode, respectively, so that different interactive functions can be provided for the user in the first display mode and the second display mode, respectively, thereby better meeting the diversified interaction requirements of the user in different display modes.

For example, the interactive operation configured to be performed through the first interactive control or the second interactive control may be a local interactive operation performed by the user with the target object on the user terminal 110. For example, for different display modes, the interactive operation configured to be performed through the first interactive control may be determined based on such as display information on the target object display interface in the first display mode, and the interactive operation configured to be performed through the second interactive control may be determined based on such as display information on the target object display interface in the second display mode. In other words, specific interactive operations configured to be performed through the first interactive control and the second interactive control may be associated with mode features of corresponding different display modes.

For example, taking the case that the display mode is the clear screen display mode as an example, in the clear screen display mode, the interactive control may be configured to perform such as adjustable operations for changing the display information (e.g., a display position, a display scale, a display rotation, or the like) of the target object, and the interactive control may also be configured to perform interactive operations such as storing partial information or all information of the target object on the user terminal 110. For example, data generated by the local interactive operation may not need to be uploaded and stored on the server 130. For example, taking the case that the interaction method provided by the present disclosure is applied to the video social software as an example, the local interactive operation may include an adjustment operation made by the user regarding a playing image, a playing rate, a playing volume, or the like of the video when watching the video through the video social software, or the local interactive operation may also include an obtaining operation, such as downloading and image capturing on the video.

For another example, the interactive operation configured to be performed through one of the first interactive control and the second interactive control may also be an online interactive operation performed among a plurality of users of different user terminals 110 (i.e., a plurality of operators of different user terminals 110), so as to achieve information interaction between the plurality of users. For example, data generated by the online interactive operation needs to be uploaded and stored on the server 130, so as to achieve data transmission and interaction between the different user terminals 110 and the server 130. For example, taking the case that the interaction method provided by the present disclosure is applied to the video social software as an example, the online interactive operation may include operations such as the "like," "favorite," "comment," and "forward" made by the user for the video when watching the video through the video social software.

For example, regarding Step S20 described above, the display mode switching may be used for switching the target object display interface between different display modes. In Step S20 described above, when the display mode switching made by the user on the target object display interface is received, display of the target object in the first display mode on the target object display interface is switched to display in the second display mode on the target object display interface.

For example, the display mode switching may be a touch control operation made by the user directly on the target object display interface using such as a finger, a stylus or other touch control manners. Alternatively, the display mode switching may also be a control operation (e.g., single-click or double-click) made on the target object display interface by the user through an external input device, such as a mouse, a keyboard, or the like. The embodiments of the present disclosure do not impose limitations on the specific implementations of the display mode switching.

For example, taking the case that the display mode switching is a touch control operation based on a touch point on the target object display interface as an example, the display mode switching may be set as one or more touch points in a touch control region of the target object display interface being triggered, or may be further set as one or more touch points in the touch control region of the target object display interface being triggered and moving in a preset direction or a preset path. For example, when the user terminal 110 detects that one touch point in the touch control region of the target object display interface is triggered and moves, for example, in a preset leftward, rightward, upward or downward direction, the first display mode is switched to the second display mode. Alternatively, when the user terminal 110 detects that a plurality of touch points in the touch control region of the target object display interface are triggered and respectively move along multiple paths in preset directions of being far away from one another, being close to one another, or being parallel to one another, the first display mode is switched to the second display mode. Alternatively, when the user terminal 110 detects that a plurality of touch points in the touch control region of the target object display interface are triggered and moved into a preset region in the touch control region, the first display mode is switched to the second display mode. The embodiments of the present disclosure do not impose limitations on the specific implementation of the display mode switching in the touch control operation mode.

Figure 3A:
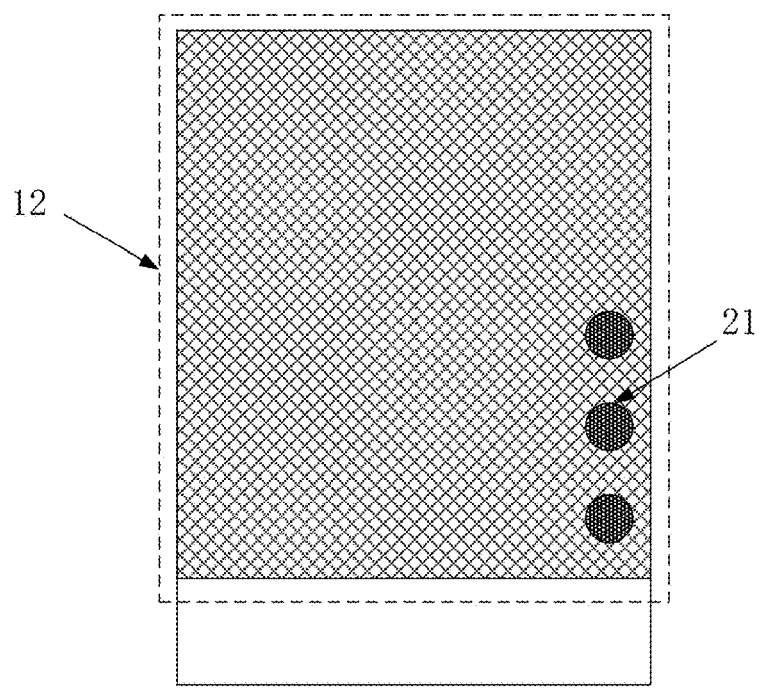
FIG. 3A to FIG. 3C are schematic diagrams of displaying a target object in different display modes provided by some embodiments of the present disclosure.
Figure 3B:
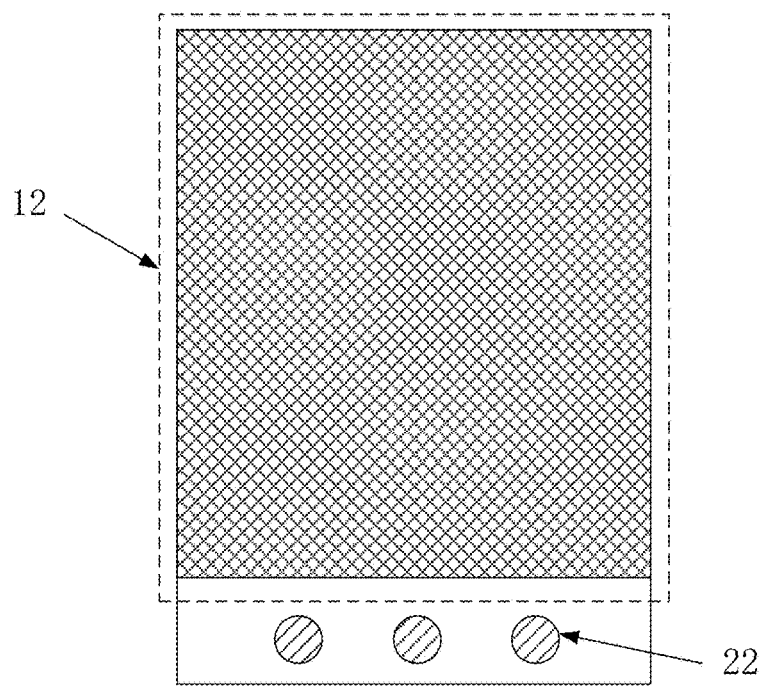

FIG. 3A and FIG. 3B are schematic diagrams of displaying a target object in different display modes provided by some embodiments of the present disclosure. For example, FIG. 3A is a schematic diagram of displaying the target object in the first display mode on the target object display interface 11, and FIG. 3B is a schematic diagram of displaying the target object in the second display mode on the target object display interface 11. It needs to be noted that, in some other embodiments of the present disclosure, it may also be that FIG. 3A is a schematic diagram of displaying the target object in the second display mode on the target object display interface 11, and FIG. 3B is a schematic diagram of displaying the target object in the first display mode on the target object display interface 11.

For example, with reference to FIG. 3A and FIG. 3B, in the interaction method provided by the embodiments of the present disclosure, after the display mode switching is received on the target object display interface 11, the display mode of the target object on the target object display interface 11 is switched from the first display mode shown in FIG. 3A to the second display mode shown in FIG. 3B.

For example, in the process of switching from the first display mode shown in FIG. 3A to the second display mode shown in FIG. 3B, a display attribute of a display image region 12 of the target object on the target object display interface 11 remains unchanged. For example, the display attribute includes a display scale, a display position, an image size ratio, or the like of the display image region 12 of the target object on the target object display interface 11.

For example, with reference to FIG. 3A and FIG. 3B, the display image region 12 of the target object occupies the same display scale on the target object display interface 11 in both of the first display mode shown in FIG. 3A and the second display mode shown in FIG. 3B. That is, in the display mode switching process, a ratio of an area of a region occupied by the display image region 12 of the target object on the target object display interface 11 to a total area of the target object display interface 11 remains unchanged.

For example, the display image region 12 of the target object uses the same image size ratio in both of the first display mode shown in FIG. 3A and the second display mode shown in FIG. 3B. That is, in the display mode switching process, a ratio of a width and a height of the display image region 12 of the target object remains unchanged.

For example, the display image region 12 of the target object is located at the same display position on the target object display interface 11 in both of the first display mode shown in FIG. 3A and the second display mode shown in FIG. 3B. For example, in the display mode switching process, a relative positional relationship between a center of the display image region 12 of the target object and a center of the target object display interface 11 remains unchanged, and a relative positional relationship between each edge of the display image region 12 of the target object and each edge of the target object display interface 11 remains unchanged.

For example, taking the case that the target object is a video as an example, the video has the same playing state in the first display mode shown in FIG. 3A and the second display mode shown in FIG. 3B. For example, in the display mode switching process, a playing or pause state, a playing rate, a playing volume, an image definition, and the like of the video remain unchanged.

As illustrated in FIG. 3A, in the first display mode, the target object display interface 11 includes a first interactive control 21. For example, FIG. 3A illustrates three first interactive controls 21, and the three first interactive controls 21 are arranged in sequence from top to bottom along the right edge of the target object display interface 11.

As illustrated in FIG. 3B, in the second display mode, the target object display interface 11 includes a second interactive control 22. For example, FIG. 3B illustrates three second interactive controls 22, and the three second interactive controls 22 are arranged in sequence from left to right along the bottom edge of the target object display interface 11.

It needs to be noted that the embodiments of the present disclosure do not impose particular limitations on the number of the first interactive controls 21 included on the target object display interface 11 in the first display mode, an arrangement manner of the first interactive controls 21 on the target object display interface 11, the number of the second interactive controls 22 included on the target object display interface 11 in the second display mode, an arrangement manner of the second interactive controls 22 on the target object display interface 11, or the like.

For example, in the first display mode shown in FIG. 3A, the first interactive controls 21 are located within the display image region 12 of the target object on the target object display interface 11, and part of the display image region 12 of the target object is covered by the first interactive controls 21. In the second display mode shown in FIG. 3B, the second interactive controls 22 are located within the region other than the display image region 12 of the target object on the target object display interface 11, for example, located in an adjacent region on a lower side of the display image region 12 of the target object, so that any region in the display image region 12 of the target object is not covered by the second interactive controls 22. Thus, by adopting two different setting manners in different display modes which allow the interactive controls to cover and not to cover the display image region 12 of the target object, respectively, different display effects can be provided for the user, and further, different corresponding interactive controls may be provided based on different display modes, thereby enhancing the user experience.

For example, the second display mode shown in FIG. 3B is the clear screen display mode. In the clear screen display mode, there is no interactive control provided within the display image region 12 of the target object, so that the display image region 12 of the target object is not covered, thereby providing the user with a complete display image and facilitating improving the viewing experience of the user. It should be noted that the display image region 12 of the target object refers to a complete image for showing the visible information of the target object. In the second display mode shown in FIG. 3B, the display image region 12 does not include any display element or display information except for the visible information of the target object, so that the display image region 12 of the target object is not covered by other display elements or display information. For example, taking the target object display interface 11 in the first display mode shown in FIG. 3A as an example, the first interactive controls 21 are located within the display image region 12 of the target object, and the display image region 12 of the target object is covered by the first interactive controls 21. For example, in other words, for the same video frame or the same picture, the display image region of the target object in the first display mode shown in FIG. 3A is the same as the display image region of the target object in the second display mode shown in FIG. 3B.

For example, as illustrated in FIG. 3B, in the second display mode, the display image region 12 of the target object is not covered by any display element or display object on the target object display interface 11. For example, in the second display mode, the target object display interface 11 is in the "clear screen display mode." That is, any display element or display object that may cover the display image region 12 of the target object on the target object display interface 11 is cleared away. Thus, it is advantageous for the user to obtain more complete visible information about the target object, so that the intuitive feeling of the user for the display image region 12 of the target object in the second display mode can be enhanced, and the viewing experience of the user for the display image region 12 of the target object can be optimized.

For example, the first interactive control 21 may be configured to perform a first-type interactive operation, and the second interactive control 22 may be configured to perform a second-type interactive operation different from the first-type interactive operation. In the clear screen display mode, the display image region 12 of the target object is not covered, so that an operation suitable for the clear screen display mode, such as taking a screenshot, can be performed. Thus, the first interactive control 21 and the second interactive control 22 are enabled to provide different types of interactive functions for the user in different display modes, respectively, thereby facilitating meeting the diversified interaction requirements of the user in different display modes.

For example, for the two different display modes which allow the interactive control to cover and not to cover the display image region 12 of the target object on the target object display interface 11 shown in FIG. 3A and FIG. 3B, the first interactive control 21 and the second interactive control 22 may be configured to provide interactive operations to be performed in the two different display modes, respectively. Thus, not only can the visual effect of the display image region 12 of the target object be improved, but also the interaction experience of the user in different display modes can be optimized.

Figure 3C:
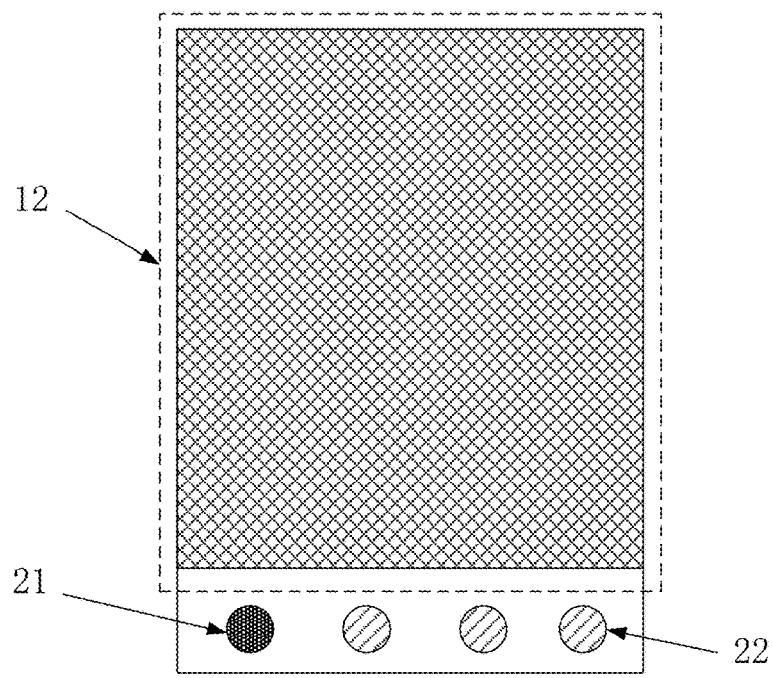

Alternatively, in some other embodiments of the present disclosure, as illustrated in FIG. 3C, in the second display mode, the target object display interface 11 may further include the first interactive control 21. That is, in the second display mode, the target object display interface 11 may include the second interactive control 22 as well as the first interactive control 21.

It should be noted that, in the embodiments shown in FIG. 3C, the target object display interface 11 in the second display mode includes some of the first interactive controls 21 in the first display mode, e.g., includes one of multiple first interactive controls 21 in the first display mode. In some other embodiments, according to different actual requirements, for example, according to an actual operation requirement in the second display mode, the target object display interface 11 in the second display mode may also include more first interactive controls 21, e.g., include all the first interactive controls 21 in the first display mode. The embodiments of the present disclosure are not particularly limited in this aspect.

For example, the second display mode shown in FIG. 3C is the clear screen display mode (e.g., with reference to the above corresponding description regarding the second display mode shown in FIG. 3B). As illustrated in FIG. 3C, the first interactive control 21 and the second interactive control 22 are both located within the region other than the display image region 12 of the target object on the target object display interface 11. Thus, not only can the visual effect of the display image region 12 of the target object in the second display mode be improved, but also more diversified interaction requirements of the user can be met, so that the interaction experience of the user in the clear screen display mode can be enriched.

An implementation of the interaction method provided by the embodiments of the present disclosure in a specific application scenario will be described below, which takes the application scenario of social software for interaction between different users based on multimedia resources (e.g., videos or pictures) as an example. It should be noted that the interaction method provided by the embodiments of the present disclosure may also be applied to other different scenarios, which are not limited in the embodiments of the present disclosure.

Figure 4A:
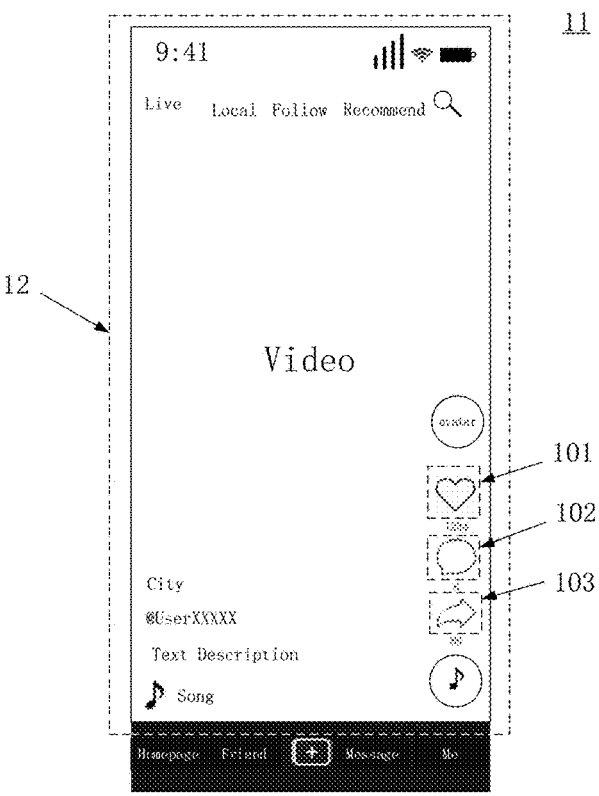
FIG. 4A and FIG. 4B are schematic diagrams of examples of a target object display interface in different display modes provided by some embodiments of the present disclosure.
Figure 4B:
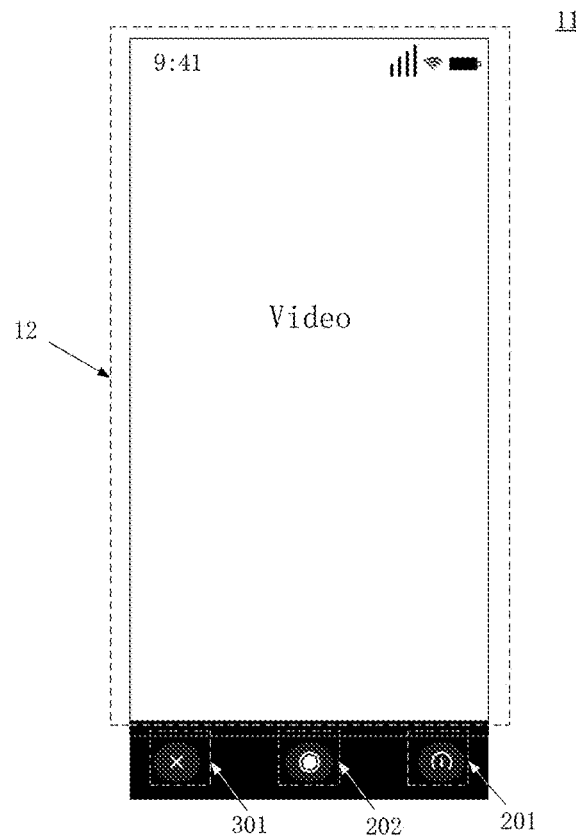

FIG. 4A and FIG. 4B are schematic diagrams of examples of a target object display interface in different display modes provided by some embodiments of the present disclosure. For example, FIG. 4A and FIG. 4B are schematic diagrams of a specific application example of an interaction method provided by some embodiments of the present disclosure. In the examples shown in FIG. 4A and FIG. 4B, the target object for displaying on the target object display interface 11 is a video, and FIG. 4A and FIG. 4B are schematic diagrams of displaying the video in different display modes on the target object display interface 11, respectively.

Taking the case that the display mode shown in FIG. 4A is the first display mode and the display mode shown in FIG. 4B is the second display mode as an example, the interaction method provided by some embodiments of the present disclosure is described below in combination with the examples shown in FIG. 4A and FIG. 4B. That is, after the display mode switching is received, display of the video in the first display mode shown in FIG. 4A on the target object display interface 11 is switched to display in the second display mode shown in FIG. 4B. It needs to be noted that, in some other examples, it may also be that the display mode shown in FIG. 4A is the second display mode, and the display mode shown in FIG. 4B is the first display mode, which will not be particularly limited in the embodiments of the present disclosure.

For example, as illustrated in FIG. 4A and FIG. 4B, in the process of switching from the first display mode shown in FIG. 4A to the second display mode shown in FIG. 4B, a display attribute (e.g., a display scale, a display position, an image size ratio, or the like) of the display image region 12 of the video on the target object display interface 11 remains unchanged.

As illustrated in FIG. 4A, in the first display mode, the target object display interface 11 includes first interactive controls 101 to 103. The first interactive controls 101 and 103 may be configured to perform the first-type interactive operations based on the video. For example, the first interactive controls 101 and 103 are configured to perform the "like" and "forward" operations for the video, respectively. The first interactive control 102 may be configured to perform an interactive operation between users associated with the video. For example, the users associated with the video may include a user posting the video (e.g., a video poster), users watching the video, and the like. For example, on the target object display interface 11, by clicking on the first interactive control 102, a comment section interface regarding the video is allowed to be displayed on the target object display interface 11, and a user can interact with the user posting the video or other users watching the video in the comment section interface, for example, by leaving words in the comment section interface.

Figure 7A:
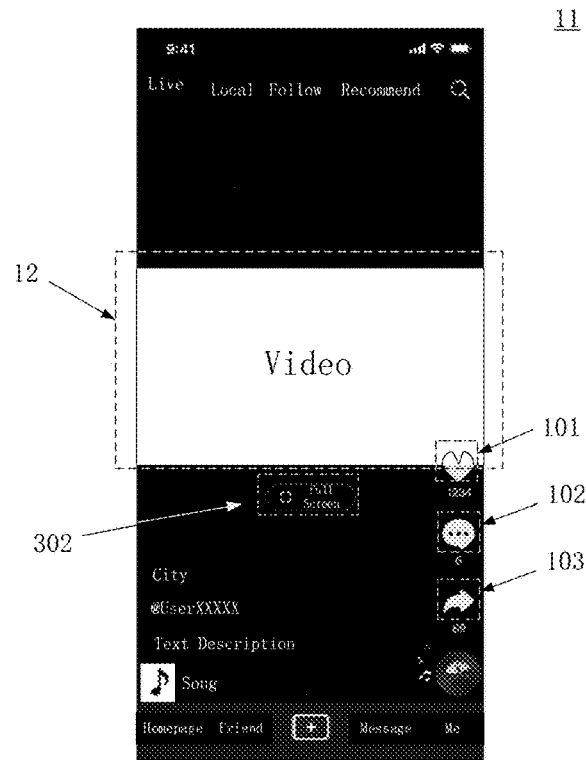
FIG. 7A and FIG. 7B are schematic diagrams of another examples of a target object display interface in different display modes provided by some embodiments of the present disclosure.

For example, as illustrated in FIG. 4A, in the first display mode, the first interactive controls 101 to 103 are all located within the display image region 12 of the video on the target object display interface 11, and part of the display image region 12 of the video is covered by the first interactive controls 101 to 103. Alternatively, in some other examples, as illustrated in FIG. 7A, in the first display mode, the first interactive controls 101 to 103 are partially located within the display image region 12 of the video and partially located outside the display image region 12 of the video. For example, on the target object display interface 11 shown in FIG. 7A, the first interactive control 101 is partially located within the display image region 12 of the video and partially located outside the display image region 12 of the video, and the first interactive controls 102 and 103 are both located in the region other than the display image region 12 of the video.

For example, as illustrated in FIG. 4A, compared with the target object display interface 11 in the second display mode shown in FIG. 4B, the target object display interface 11 in the first display mode shown in FIG. 4A further includes data information of the video, e.g., includes data information related to the video, such as text description of the video content, the video poster (e.g., "XXXXX" shown in FIG. 4A), or the like.

For example, as illustrated in FIG. 4A, the data information of the video is located within the display image region 12 of the video on the target object display interface 11. That is, the data information of the video on the target object display interface 11 covers the display image region 12 of the video without extra occupying other region on the target object display interface 11. Thus, it is conducive to increasing the display scale of the display image region 12 of the target object on the target object display interface 11 and also beneficial for the user intuitively obtaining the data information related to the video from the target object display interface 11 while watching the video.

Alternatively, in some other examples, as illustrated in FIG. 7A, on the target object display interface 11, the data information of the video may also be provided in the region other than the display image region 12 of the video. Thus, the data information of the video does not cover the display image region 12 of the video on the target object display interface 11, thereby being conducive to more completely and fully showing the display image region 12 of the video on the target object display interface 11 and thus allowing the user watching the video to accurately obtain the display information of each part or each region in the display image region 12.

For example, as illustrated in FIG. 4A, the target object display interface 11 in the first display mode may further include other interactive controls or interactive regions different from the first interactive controls 101 to 103, so as to allow the user to perform other interactive operations on the target object display interface 11 in the first display mode.

For example, as illustrated in FIG. 4A, below the first interactive control 103 and the data information of the video, the target object display interface 11 further includes an audio interactive region for providing audio information about the video. For example, the audio information of the video is in scrollable display in the form of a single-line text in the audio interactive region, and the user may obtain the entire audio information about the video, for example, by clicking on the audio interactive region. For example, after the user clicks on the audio interactive region, the full audio information about the video is displayed on the target object display interface 11.

For example, as illustrated in FIG. 4A, above the data information of the video, the target object display interface 11 further includes a location information interactive region for providing geographical location information about the video poster. For example, city information of the video poster may be directly displayed in the location information interactive region. The user may obtain more detailed geographical location information about the video poster, for example, by clicking on the location information interactive region. For example, after the user clicks on the location information interactive region, the detailed geographical location information about the video poster will be displayed on the target object display interface 11.

For example, as illustrated in FIG. 4A, above the first interactive controls 101 to 103, the target object display interface 11 further includes personal information interactive region for providing personal information about the video poster. For example, an avatar used by the video poster in the social software is displayed in the personal information interactive region. The user may obtain more detailed personal information about the video poster, for example, by clicking on the personal information interactive region. For example, after the user clicks on the personal information interactive region, the detailed personal information of the video poster will be displayed on the target object display interface 11. Alternatively, the user may enter other associated display interfaces by clicking on the personal information interactive region, so as to obtain the detailed personal information about the video poster.

For example, as illustrated in FIG. 4A, the target object display interface 11 further includes a plurality of different interactive controls at the bottom of the target object display interface 11, for example, "Homepage," "Friend," "+," "Message," and "Me," so as to allow the user to enter other information display interfaces of the social software through these different interactive controls, respectively.

For example, as illustrated in FIG. 4A, the target object display interface 11 at the top region further includes time information "9:41" at the top left corner of the interface and device information about the user terminal at the top right corner of the interface.

For example, as illustrated in FIG. 4A, the target object display interface 11 at the top region further includes a plurality of different interactive controls, e.g., "Live," "Local," "Follow," "Recommend," and "🔍," so as to allow the user to enter other information display interfaces of the social software through these different interactive controls.

For example, in some other examples, as illustrated in FIG. 7A, the target object display interface 11 in the first display mode may further include a third interactive control 302 located below the display image region 12 of the video. For example, the third interactive control 302 may be configured to perform an operation of switching between different display modes. For example, after the third interactive control 302 is triggered, the display mode of the video may be switched from the first display mode shown in FIG. 7A to a full screen display mode shown in FIG. 8. For example, the full screen display mode shown in FIG. 8 may be a third display mode different from the first display mode and the second display mode. For example, in the third display mode shown in FIG. 8, there is no interactive control included on the target object display interface 11. For example, after the target object display interface 11 is switched from the second display mode shown in FIG. 7B to the third display mode shown in FIG. 8, the display attribute of the display image region 12 of the video on the target object display interface 11 is changed. For example, as illustrated in FIG. 8, the display attribute (e.g., a display scale, a rotation angle, or the like) of the display image region 12 of the video on the target object display interface 11 is changed.

It needs to be noted that, in some other examples, the target object display interface 11 in the first display mode may further include other interactive controls, interactive regions or display information, which will not be particularly limited in the embodiments of the present disclosure.

For example, as illustrated in FIG. 4B, in the second display mode, the target object display interface 11 includes the second interactive controls 201 and 202, and further includes the third interactive control 301.

Figure 5:
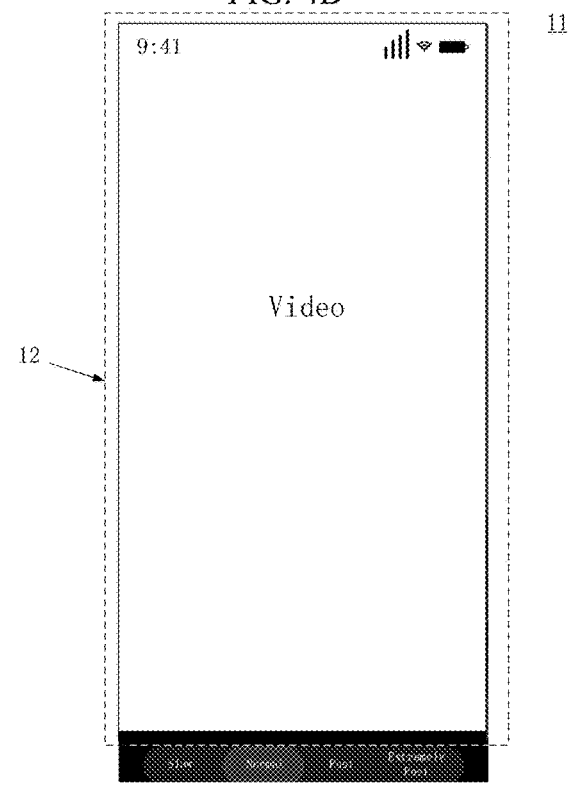
FIG. 5 is a schematic diagram of an example of a target object display interface in a second display mode provided by some embodiments of the present disclosure.

For example, the second interactive control 201 may be configured to perform an adjustable operation for the display information of the video, e.g., may be configured to change the playing state of the video. For example, after the second interactive control 201 is triggered, as illustrated in FIG. 5, four interactive regions "Slow," "Normal," "Fast," and "Extremely Fast" for changing the playing rate of the video are displayed directly below the display image region 12 of the video, so as to allow the user to adjust the current playing rate of the video through the four touch control regions according to actual requirements, thereby optimizing the user's video viewing experience.

Figure 6:
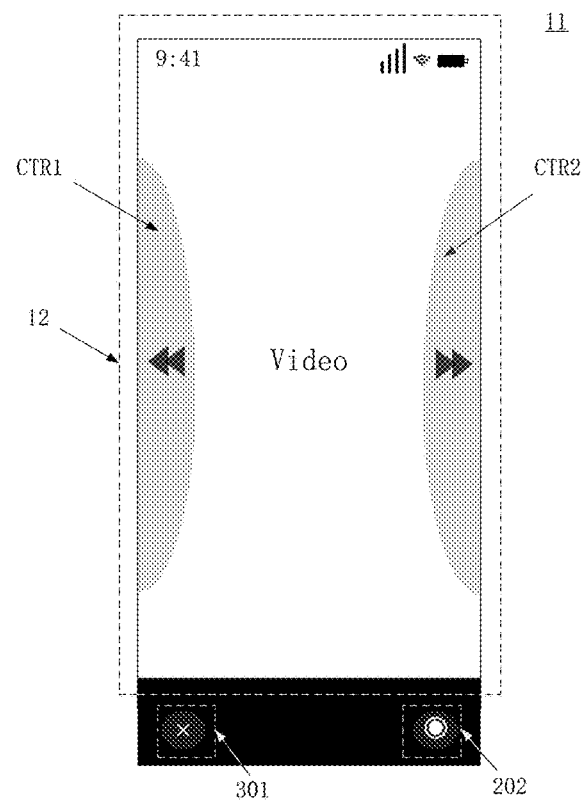
FIG. 6 is a schematic diagram of another example of a target object display interface in a second display mode provided by some embodiments of the present disclosure.

Alternatively, in some other examples of the present disclosure, the playing state of the video may also be adjusted by triggering a gesture interaction control region on the target object display interface 11. For example, as illustrated in FIG. 6, in the second display mode, the target object display interface 11 further includes gesture interaction control regions for changing the playing state of the video, for example, a first playing rate control region CTR1 and a second playing rate control region CTR2. After the first playing rate control region CTR1 and the second playing rate control region CTR2 are triggered, the first playing rate control region CTR1 and the second playing rate control region CTR2 are displayed on the target object display interface 11, so that the current playing state of the video may be changed by means of the first playing rate control region CTR1 and the second playing rate control region CTR2.

For example, after the first playing rate control region CTR1 is triggered, the current playing rate of the video is changed and adjusted to a first preset playing rate, and the first preset playing rate is a first multiple of the current playing rate of the video. After the second playing rate control region CTR2 is triggered, the current playing rate of the video is changed and adjusted to a second preset playing rate, the second preset playing rate is a second multiple of the current playing rate of the video, and the second multiple is different from the first multiple. For example, a value of the first multiple and a value of the second multiple are not equal to one, and the first preset playing rate and the second preset playing rate are different from the current playing rate of the video.

For example, taking the example shown in FIG. 6 as an example, the first multiple may be set as less than the second multiple. For example, the value of the first multiple is set as less than one, e.g., 0.25, 0.5, 0.75, or the like, so that slow playing of the current video can be realized by triggering the first playing rate control region CTR1. For example, the value of the second multiple is set as greater than one, e.g., 1.25, 1.5, 2, or the like, so that fast forward playing of the current video can be realized by triggering the second playing rate control region CTR2.

For example, in the example shown in FIG. 6, after the first playing rate control region CTR1 or the second playing rate control region CTR2 is triggered, the first playing rate control region CTR1 and the second playing rate control region CTR2 are both displayed on the target object display interface 11. Thus, the user can adjust the current playing rate of the video accurately and rapidly by means of the first playing rate control region CTR1 and the second playing rate control region CTR2.

For example, as illustrated in FIG. 6, the target object display interface 11 may further provide an icon (e.g., "<<" illustrated in FIG. 6) for representing the speed adjustment function of the first playing rate control region CTR1, and an icon (e.g., ">>" illustrated in FIG. 6) for representing the speed adjustment function of the second playing rate control region CTR2, thereby being beneficial for the user adjusting the playing rate of the video through the first playing rate control region CTR1 and the second playing rate control region CTR2 in real time.

For example, in the example shown in FIG. 6, in the case that the target object display interface 11 includes the first playing rate control region CTR1 and the second playing rate control region CTR2, there may be no second interactive control 201 provided on the target object display interface 11, thus enhancing the intuitive feeling of the user for the display image region 12 of the target object in the second display mode. Alternatively, in some other examples, the target object display interface 11 may also include the second interactive control 201, the first playing rate control region CTR1, and the second playing rate control region CTR2, thus being beneficial for the user selecting a proper playing rate adjustment manner according to actual requirements, thereby optimizing the user's interaction experience.

For example, as illustrated in FIG. 4B, the second interactive control 202 may be configured to perform an obtaining operation for the display information of the video, e.g., configured to perform the obtaining operation for the current display image region 12 of the video. For example, after the second interactive control 202 is triggered, the current display image region 12 of the video will be captured to generate a screenshot, and the generated screenshot is the current display image region 12 of the video. That is, the generated screenshot does not include, for example, the time information "9:41" at the top left corner or the device information about the user terminal at the top right corner on the target object display interface 11 shown in FIG. 4B, and does not include a black region located below the display image region 12 of the video on the target object display interface 11 and the display information about such as the second interactive controls 201 and 202 and the third interactive control 301 in the black region.

Alternatively, in some other examples of the present disclosure, after the second interactive control 202 is triggered, the current image of the target object display interface 11 will be captured to generate a screenshot including the full visible information of the current target object display interface 11. For example, the generated screenshot may be as shown in FIG. 4B. That is, the generated screenshot includes the current display image region 12 of the video, and also includes, for example, the time information "9:41" covering the display image region 12 of the video at the top left corner and the device information about the user terminal covering the display image region 12 of the video at the top right corner on the target object display interface 11, and also includes the black region located below the display image region 12 of the video on the target object display interface 11 and the display information about, for example, the second interactive controls 201 and 202 and the third interactive control 301 in the black region.

Alternatively, in some other examples of the present disclosure, after the second interactive control 202 is triggered, the target object display interface 11 may further provide a plurality of interactive controls for image capturing operations. The plurality of interactive controls may be configured to capture the current display image region 12 of the video or capture the current image of the target object display interface 11. The user may select among the plurality of interactive controls according to different actual requirements, so as to obtain a desired screenshot.

For example, as illustrated in FIG. 4B, the target object display interface 11 in the second display mode further includes the third interactive control 301. The third interactive control 301 may be configured to perform the operation of switching between different display modes. For example, after the third interactive control 301 is triggered, the display mode of the video is switched from the second display mode shown in FIG. 4B to the first display mode shown in FIG. 4A.

Figure 7B:
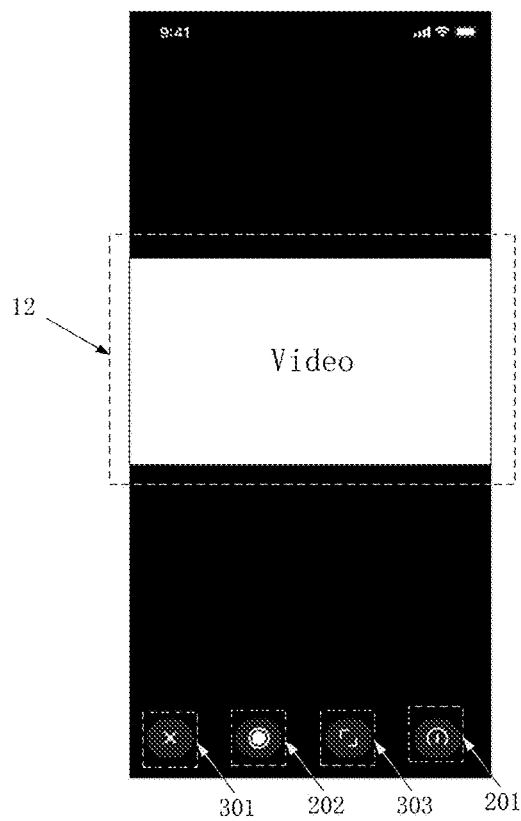
Figure 8:
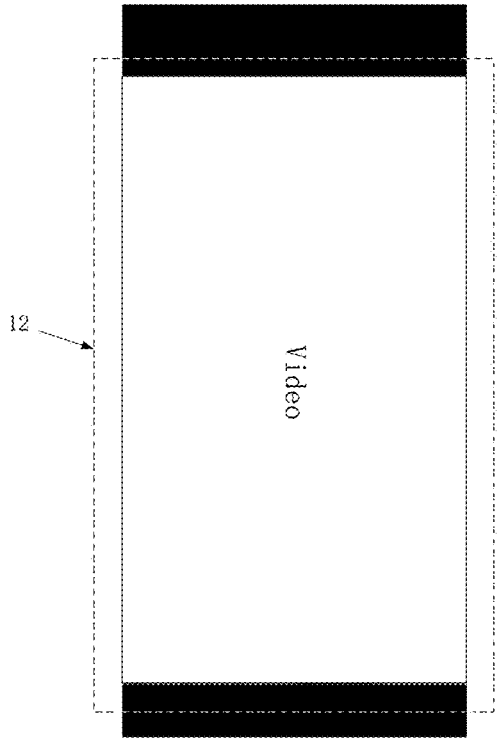
FIG. 8 is a schematic diagram of an example of a target object display interface in a third display mode provided by some embodiments of the present disclosure.

For example, in some other examples of the present disclosure, as illustrated in FIG. 7B, in the second display mode, in addition to the second interactive controls 201 and 202 and the third interactive control 301, the target object display interface 11 may further include a third interactive control 303. For example, the third interactive control 303 may be configured to perform the operation of switching between different display modes. For example, after the third interactive control 303 is triggered, the display mode of the video may be switched from the second display mode shown in FIG. 7B to the full screen display mode shown in FIG. 8. For example, the full screen display mode shown in FIG. 8 may be the third display mode different from the first display mode and the second display mode. For example, in the third display mode shown in FIG. 8, there is no interactive control included on the target object display interface 11. For example, after the target object display interface 11 is switched from the second display mode shown in FIG. 7B to the third display mode shown in FIG. 8, the display attribute of the display image region 12 of the video on the target object display interface 11 is changed. For example, as illustrated in FIG. 8, the display attribute (e.g., a display scale, a rotation angle, or the like) of the display image region 12 of the video on the target object display interface 11 is changed.

For example, in some other examples of the present disclosure, in the second display mode, in addition to the second interactive controls 201 and 202 and the third interactive controls 301 and 303, the target object display interface 11 may further include other interactive controls or interactive regions to perform other operations, such as storing the video, which will not be particularly limited in the embodiments of the present disclosure.

For example, taking the example shown in FIG. 4B as an example, in the second display mode, the second interactive controls 201 and 202 and the third interactive control 301 on the target object display interface 11 are all located within the region other than the display image region 12 of the video on the target object display interface 11.

For example, in the examples shown in FIG. 4A and FIG. 4B, in the first display mode, the first interactive controls 101 to 103 and the video are displayed synchronously on the target object display interface 11. In the second display mode, the second interactive controls 201 and 202, the third interactive control 301, and the video are displayed synchronously on the target object display interface 11. In some other examples of the present disclosure, the second interactive controls 201 and 202 and the third interactive control 301 may also be triggered and displayed on the target object display interface 11 in the process of playing the video. For example, in the process of playing the video, the user may click on the target object display interface 11, so that the second interactive controls 201 and 202 and the third interactive control 301 are displayed on the target object display interface 11.

It needs to be noted that the specific description of the examples shown in FIG. 5 to FIG. 8 may refer to the corresponding contents in the examples shown in FIG. 4A and FIG. 4B, which will not be described here redundantly.

Figure 9A:
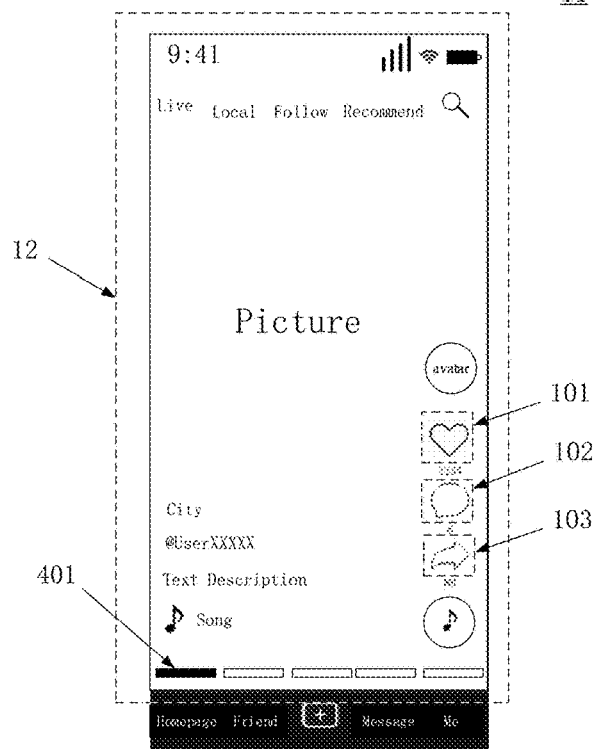
FIG. 9A and FIG. 9B are schematic diagrams of further still another examples of a target object display interface in different display modes provided by some embodiments of the present disclosure.
Figure 9B:
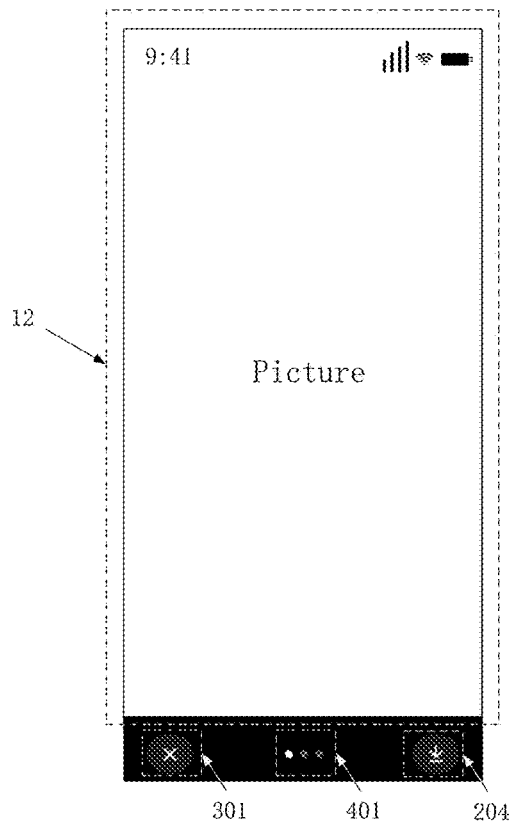

FIG. 9A and FIG. 9B are schematic diagrams of further still another examples of a target object display interface in different display modes provided by some embodiments of the present disclosure. For example, FIG. 9A and FIG. 9B are schematic diagrams of a specific application example of an interaction method provided by some embodiments of the present disclosure. In the examples shown in FIG. 9A and FIG. 9B, the target object for displaying on the target object display interface 11 is a plurality of pictures, and FIG. 9A and FIG. 9B are schematic diagrams of displaying the plurality of pictures in different display modes on the target object display interface 11, respectively.

The interaction method provided by some embodiments of the present disclosure is described below in combination with the examples shown in FIG. 9A and FIG. 9B by taking the case that the display mode shown in FIG. 9A is the first display mode and the display mode shown in FIG. 9B is the second display mode as an example. That is, after the display mode switching is received, displaying the plurality of pictures in the first display mode shown in FIG. 9A on the target object display interface 11 is switched to displaying in the second display mode shown in FIG. 9B. It needs to be noted that, in some other examples, the display mode shown in FIG. 9A may also be the second display mode, and the display mode shown in FIG. 9B may also be the first display mode, which will not be particularly limited in the embodiments of the present disclosure.

For example, as illustrated in FIG. 9A, the target object display interface 11 in the first display mode further includes a plurality of picture display interactive controls 401. The plurality of picture display interactive controls 401 are located within the display image region 12 of the pictures, e.g., located at the bottom of the display image region 12 of the pictures.

The plurality of picture display interactive controls 401 correspond to multiple pictures, respectively, and may be configured to display the order of the current picture shown on the target object display interface 11 among the multiple pictures, so as to allow the user to obtain the current showing progress of the multiple pictures. For example, when one picture display interactive control 401 of the plurality of picture display interactive controls 401 is triggered, the picture corresponding to the triggered picture display interactive control 401 is displayed on the target object display interface 11, thus realizing switching of display of the multiple pictures on the target object display interface 11. For another example, the user may switch displaying of the multiple pictures on the target object display interface 11 by performing an operation such as leftward or rightward sliding on the target object display interface 11. The embodiments of the present disclosure do not impose limitations on the specific switching display method for the multiple pictures.

For example, as illustrated in FIG. 9A, the data information provided on the target object display interface 11 in the first display mode further includes type information about the target object, for example, "picture-text" type information about the picture.

For example, compared with the picture display interactive controls 401 in the first display mode, as illustrated in FIG. 9B, in the second display mode, the plurality of picture display interactive controls 401 on the target object display interface 11 are located below the display image region 12 of the pictures and displayed in the form of " . . . " on the target object display interface 11, thereby being conducive to avoiding covering the display image region 12 of the pictures.

For example, as illustrated in FIG. 9B, in addition to the third interactive control 301, the target object display interface 11 in the second display mode further includes a second interactive control 204. The second interactive control 204 may be configured to download the currently displayed picture on the target object display interface 11. For example, after the second interactive control 204 is triggered, the currently displayed picture on the target object display interface 11 may be downloaded and stored on the user terminal.

Figure 10:
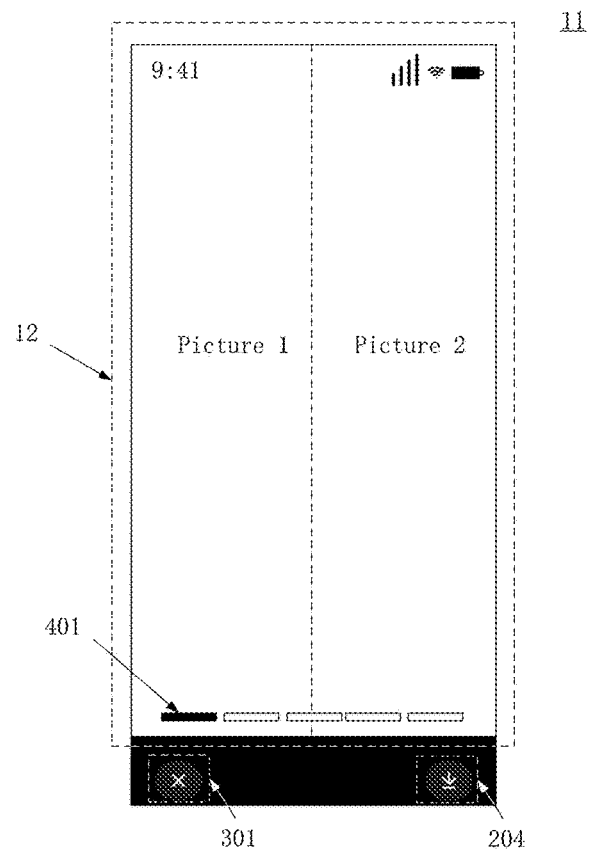
FIG. 10 is a schematic diagram of further still another example of a target object display interface in a second display mode provided by some embodiments of the present disclosure.

For example, FIG. 10 illustrates switching of displaying between multiple pictures. As illustrated in FIG. 10, for example, the user may perform a touch control operation of leftward or rightward sliding on the target object display interface 11 to realize switching of displaying between picture 1 and picture 2. Taking for example that the currently displayed picture on the target object display interface 11 is the picture 1, the display state of the picture display interactive control 401 corresponding to the picture 1 is different from those of other picture display interactive controls 401, so as to prompt the order of the currently displayed picture on the target object display interface 11 among the multiple pictures for the user. When the user starts to perform the touch control operation of rightward sliding on the target object display interface 11, the target object display interface 11 shows the case as illustrated in FIG. 10, and after the user completes the touch control operation of rightward sliding, the target object display interface 11 is switched to display the picture 2, thus achieving the switching of display between the multiple pictures.

For example, in some other examples, the target object display interface 11 in the second display mode may further include an interactive control, which is configured to perform other interactive operations, other than the second interactive control 204 described above, e.g., may further include other different second interactive control configured to perform a second-type interactive operation. For example, the other different second interactive control may be configured to perform an operation of changing the display attribute (e.g., a display scale, a rotation angle, an image size ratio, or the like) of the display image region 12 of the pictures on the target object display interface 11. The embodiments of the present disclosure do not impose particular limitations on the second-type interactive operation that the second interactive control included on the target object display interface 11 may be configured to perform in the second display mode.

It needs to be noted that other contents in the examples shown in FIG. 9A to FIG. 10 may refer to the corresponding description in the examples shown in FIG. 4A and FIG. 4B, which will not be described here redundantly.

It needs to be noted that, in the foregoing examples, the specific implementations of the interaction method provided by the embodiments of the present disclosure are described by taking the application scenario of the target object being a video or a picture as an example, which however will not constitute a limitation on the embodiments of the present disclosure. In some other embodiments or examples of the present disclosure, the target object may also be an object of other type that can be displayed on the target object display interface, for example, a multimedia resource such as the network live video, online live video, or the like.

It needs to be noted that in the embodiments of the present disclosure, the flow of the interaction method provided by the foregoing embodiments of the present disclosure may include more or less operations, and these operations may be performed in sequence or performed in parallel. While the flow of the interaction method described above includes a plurality of operations occurring in a particular order, it should be clearly understood that the order of the plurality of operations is not limited. The interaction method described above may be performed once or may be performed multiple times according to a predetermined condition.

Figure 11:
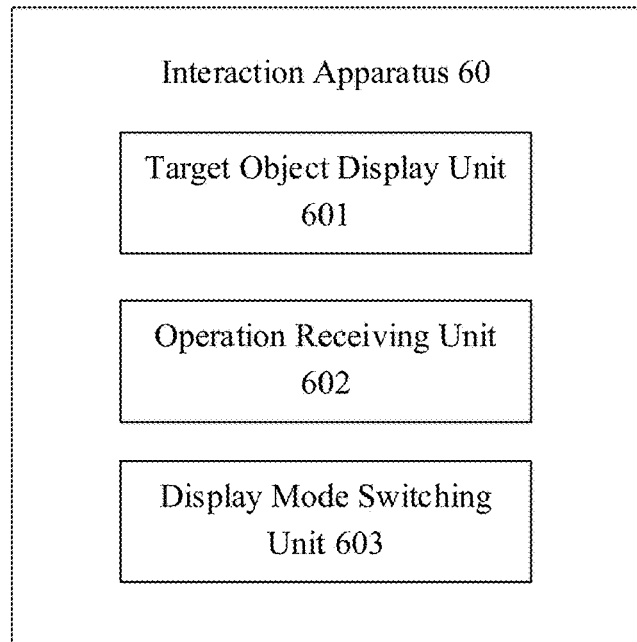
FIG. 11 is a schematic block diagram of an interaction apparatus provided by some embodiments of the present disclosure.

At least one embodiment of the present disclosure further provides an interaction apparatus. FIG. 11 is a schematic block diagram of an interaction apparatus provided by some embodiments of the present disclosure For example, as illustrated in FIG. 11, the interaction apparatus 60 includes a target object display unit 601, an operation receiving unit 602, and a display mode switching unit 603.

The target object display unit 601 is configured to display a target object in a first display mode on a target object display interface and display the target object in a second display mode on the target object display interface. In the first display mode, the target object display interface includes a first interactive control, and in the second display mode, the target object display interface includes a second interactive control, the first interactive control being different from the second interactive control. For example, the target object display unit 601 may perform at least part of operations of Step S10 and Step S30 in the interaction method shown in FIG. 2.

The operation receiving unit 602 is configured to receive a display mode switching on the target object display interface. For example, the operation receiving unit 602 may perform Step S20 in the interaction method shown in FIG. 2.

The display mode switching unit 603 is configured to switch, in response to the display mode switching, from displaying the target object in the first display mode on the target object display interface to displaying the target object in the second display mode on the target object display interface. For example, the display mode switching unit 603 may perform at least part of operations of Step S30 in the interaction method shown in FIG. 2.

For example, the target object display unit 601, the operation receiving unit 602, and the display mode switching unit 603 include codes and programs stored on a memory. A processor may perform the codes and programs to realize some functions or all functions of the target object display unit 601, the operation receiving unit 602, and the display mode switching unit 603 described above. For example, the target object display unit 601, the operation receiving unit 602, and the display mode switching unit 603 may be dedicated hardware devices configured to realize some or all functions of the target object display unit 601, the operation receiving unit 602, and the display mode switching unit 603 described above. For example, the target object display unit 601, the operation receiving unit 602, and the display mode switching unit 603 may be one circuit board or a combination of multiple circuit boards to realize the functions described above. In the embodiments of the present disclosure, the one circuit board or the combination of multiple circuit boards may include: (1) one or more processors; (2) one or more non-transitory memories connected to the processor(s); and (3) firmware which is executable by the processor(s) and stored on the memory.

It should be noted that the specific descriptions of the target object display unit 601, the operation receiving unit 602, and the display mode switching unit 603 may refer to the related descriptions of Step S10 to Step S30 shown in FIG. 2 in the embodiments of the interaction method described above, respectively. Moreover, the interaction apparatus 60 may achieve the technical effects similar to those of the interaction method described above, which will not be described here redundantly.

At least one embodiment of the present disclosure further provides an electronic device. The electronic device includes a processor and a memory. The memory includes one or more computer-executable instructions. The one or more computer-executable instructions are stored on the memory and configured to be executed by the processor. The one or more computer-executable instructions are configured to implement the interaction method provided by any one of the embodiments of the present disclosure.

Figure 12:
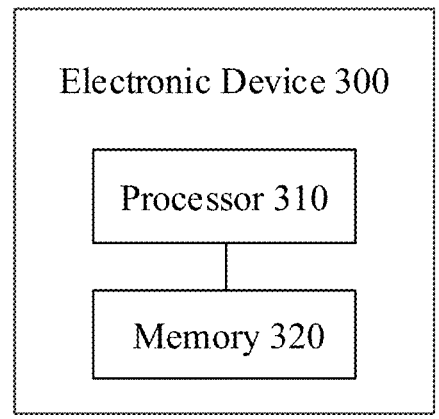
FIG. 12 is a schematic block diagram of an electronic device provided by some embodiments of the present disclosure.

FIG. 12 is a schematic block diagram of an electronic device provided by some embodiments of the present disclosure. As illustrated in FIG. 12, the electronic device 300 includes a processor 310 and a memory 320, which may be configured to implement a client terminal or a server. The memory 320 is configured to store computer-executable instructions (e.g., one or more computer program modules) in a non-transitory manner. The processor 310 is configured to run the computer-executable instructions. The computer-executable instructions, when executed by the processor 310, may implement one or more steps of the interaction method described above, thereby realizing the interaction method described above. The memory 320 and the processor 310 may be interconnected by means of a bus system and/or a connection mechanism in other forms (not shown).

For example, the processor 310 may be a central processing unit (CPU), a graphics processing unit (GPU), or a processing unit in other form having data processing capability and/or program executing capability. For example, the CPU may be an X86 or ARM architecture, or the like. The processor 310 may be a general purpose processor or a special purpose processor, and may control other components in the electronic device 300 to perform desired functions.

For example, the memory 320 may include any combination of one or more computer program products, and the computer program products may include various forms of computer-readable storage media, for example, a volatile memory and/or a non-volatile memory. The volatile memory may include, for example, a random access memory (RAM) and/or a cache, or the like. The non-volatile memory may include, for example, a read only memory (ROM), a hard disk, an erasable programmable read only memory (EPROM), a portable compact disk read only memory (CD-ROM), a USB memory, a flash memory, or the like. One or more computer program modules may be stored on the computer-readable storage medium, and the processor 310 may run the one or more computer program modules, to implement various functions of the electronic device 300. Various applications and various data, as well as various data used and/or generated by the applications may also be stored on the computer-readable storage medium.

It should be noted that, in the embodiments of the present disclosure, the specific functions and technical effects of the electronic device 300 may be with reference to the above description regarding the interaction method, which will not be described here redundantly.

Figure 13:
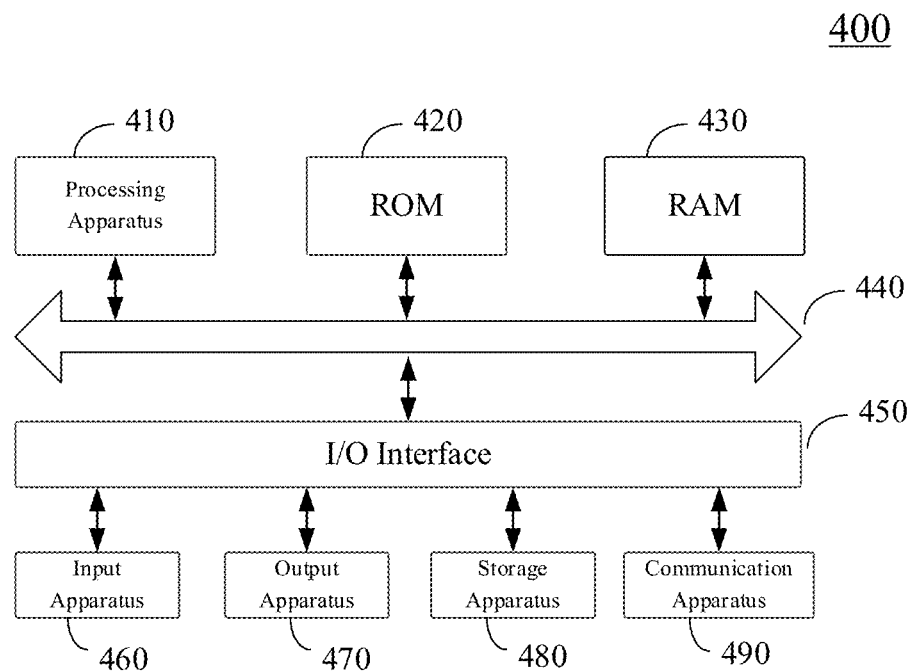
FIG. 13 is a schematic block diagram of another electronic device provided by some embodiments of the present disclosure.

FIG. 13 is a schematic block diagram of another electronic device provided by some embodiments of the present disclosure. The electronic device 400 is, for example, applicable to implementing the interaction method provided by the embodiments of the present disclosure. The electronic device 400 may be a terminal device or the like, and may be configured to implement a client terminal or a server. The electronic device 400 may include but not be limited to mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device, etc., and fixed terminals, such as a digital TV, a desktop computer, a smart home device, etc. It should be noted that the electronic device 400 shown in FIG. 13 is merely an example and will not impose any limitations on the function and the range of use of the embodiments of the present disclosure.

As illustrated in FIG. 13, the electronic device 400 may include a processing apparatus 410 (e.g., a central processing unit, a graphics processing unit, etc.), which may execute various appropriate actions and processing according to a program stored on a read-only memory (ROM) 420 or a program loaded from a storage apparatus 480 into a random access memory (RAM) 430. The random access memory (RAM) 430 further stores various programs and data required for operation of the electronic device 400. The processing apparatus 410, the ROM 420, and the RAM 430 are connected with each other through a bus 440. An input/output (I/O) interface 450 is also connected to the bus 440.

Usually, apparatuses below may be connected to the I/O interface 450: an input apparatus 460 including, for example, a touch screen, a touch pad, a keyboard, a mouse, a camera, a microphone, an accelerometer, a gyroscope, or the like; an output apparatus 470 including, for example, a liquid crystal display (LCD), a speaker, a vibrator, or the like; a storage apparatus 480 including, for example, a magnetic tape, a hard disk, or the like; and a communication apparatus 490. The communication apparatus 490 may allow the electronic device 400 to perform wireless or wired communication with other electronic devices so as to exchange data. Although FIG. 13 shows the electronic device 400 having various apparatuses, it should be understood that, it is not required to implement or have all the apparatuses illustrated, and the electronic device 400 may alternatively implement or have more or fewer apparatuses.

For example, according to the embodiments of the present disclosure, the interaction method described above may be implemented as computer software programs. For example, the embodiments of the present disclosure include a computer program product, including a computer program carried on a non-transitory computer-readable medium, and the computer program includes program codes for executing the interaction method as described above. In such embodiments, the computer program may be downloaded and installed from the network via the communication apparatus 490, or installed from the storage apparatus 480, or installed from the ROM 420. When executed by the processing apparatus 410, the computer program may implement the functions defined in the interaction method provided by the embodiments of the present disclosure.

Figure 14:
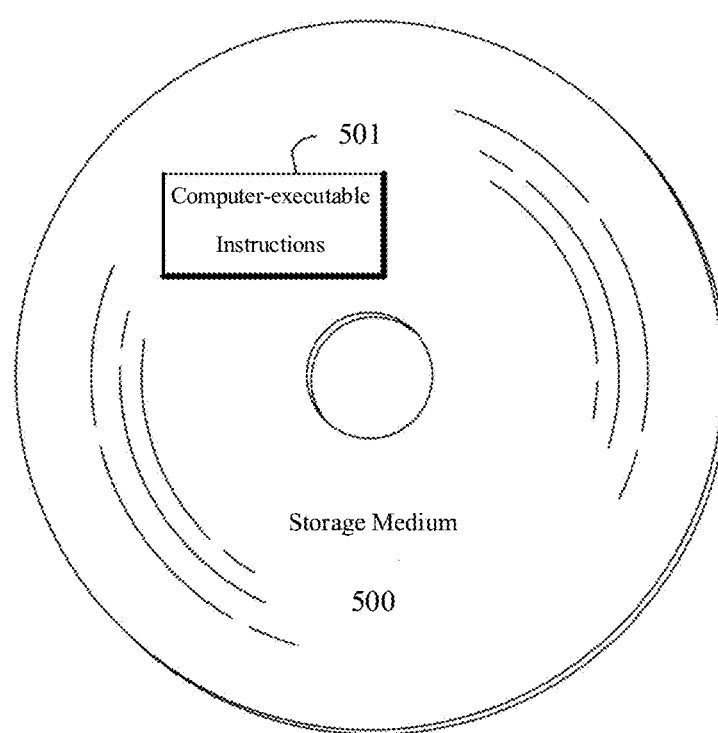
FIG. 14 is a schematic diagram of a storage medium provided by some embodiments of the present disclosure.

FIG. 14 is a schematic diagram of a storage medium provided by some embodiments of the present disclosure. For example, as illustrated in FIG. 14, the storage medium 500 may be a non-transitory computer-readable storage medium, which is configured to store non-transitory computer-executable instructions 501. When executed by the processor, the non-transitory computer-executable instructions 501 may implement the interaction method according to the embodiments of the present disclosure. For example, when executed by the processor, the non-transitory computer-executable instructions 501 may execute one or more steps of the interaction method described above.

For example, the storage medium 500 may be applied to the above-described electronic device. For example, the storage medium 500 may include a memory in the electronic device.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disc read-only memory (CD-ROM), a flash memory, or any combination of the above-described storage media, or other applicable storage media.

For example, the description of the memory in the embodiments of the electronic device may be with reference to illustration of the storage medium 500, and details will not be repeated here. The specific functions and technical effects of the storage medium 500 may be with reference to the above description regarding the interaction method, which will not be described here redundantly.

It should be noted that, in the context of the present disclosure, the computer-readable medium may be a tangible medium that may contain or store programs for use by an instruction execution system, an apparatus, or a device, or for use in combination with an instruction execution system, an apparatus, or a device. The computer-readable medium may be a computer-readable signal medium or a computer-readable storage medium, or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

In some implementations, the client terminal and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation on the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

According to one or more embodiments of the present disclosure, an interaction method, comprising: displaying a target object in a first display mode on a target object display interface, wherein in the first display mode, the target object display interface comprises a first interactive control; receiving a display mode switching on the target object display interface; and in response to the display mode switching, displaying the target object in a second display mode on the target object display interface, wherein in the second display mode, the target object display interface comprises a second interactive control different from the first interactive control.

According to one or more embodiments of the present disclosure, in response to the display mode switching, a display attribute of a display image region of the target object on the target object display interface remains unchanged.

According to one or more embodiments of the present disclosure, the display attribute of the display image region of the target object on the target object display interface remaining unchanged comprises at least one of following: a display scale of the display image region of the target object on the target object display interface remaining unchanged, or a display position of the display image region of the target object on the target object display interface remaining unchanged.

According to one or more embodiments of the present disclosure, in the first display mode, the first interactive control is located within a display image region of the target object on the target object display interface, and in the second display mode, the second interactive control is located within a region other than the display image region of the target object on the target object display interface; or in the first display mode, the first interactive control is located within the region other than the display image region of the target object on the target object display interface, and in the second display mode, the second interactive control is located within the display image region of the target object on the target object display interface.

According to one or more embodiments of the present disclosure, in response to the second display mode in which the second interactive control is located within the region other than the display image region of the target object on the target object display interface, the second display mode is a clear screen display mode; or in response to the first display mode in which the first interactive control is located within the region other than the display image region of the target object on the target object display interface, the first display mode is the clear screen display mode.

According to one or more embodiments of the present disclosure, in the first display mode, if the first interactive control is located within the display image region of the target object on the target object display interface, the target object display interface further comprises data information of the target object, and the data information of the target object is located within the display image region of the target object on the target object display interface; or in the second display mode, if the second interactive control is located within the display image region of the target object on the target object display interface, the target object display interface further comprises data information of the target object, and the data information of the target object is located within the display image region of the target object on the target object display interface.

According to one or more embodiments of the present disclosure, the first interactive control is configured to perform a first-type interactive operation, and the second interactive control is configured to perform a second-type interactive operation, the first-type interactive operation being different from the second-type interactive operation.

According to one or more embodiments of the present disclosure, in response to the second display mode in which the second interactive control is located within the region other than the display image region of the target object on the target object display interface, the second-type interactive operation comprises an adjustable operation corresponding to display information in the second display mode.

According to one or more embodiments of the present disclosure, in response to the target object being a video, in the second display mode, the target object display interface further comprises at least one gesture interaction control region corresponding to the second display mode; and in response to the gesture interaction control region being triggered, a current state of the video is changed.

According to one or more embodiments of the present disclosure, the at least one gesture interaction control region comprises a first playing rate control region and a second playing rate control region; in response to the first playing rate control region being triggered, a current playing rate of the video is changed and adjusted to a first preset playing rate, and the first preset playing rate is a first multiple of the current playing rate of the video; and in response to the second playing rate control region being triggered, the current playing rate of the video is changed and adjusted to a second preset playing rate, and the second preset playing rate is a second multiple of the current playing rate of the video, the second multiple being different from the first multiple.

According to one or more embodiments of the present disclosure, the second-type interactive operation further comprises an obtaining operation corresponding to the display information in the second display mode.

According to one or more embodiments of the present disclosure, the obtaining operation comprises any one of following operations: storing the target object; or performing image capturing on the target object display interface to generate a screenshot comprising display information of the target object.

According to one or more embodiments of the present disclosure, the screenshot is a display image of the target object on the target object display interface.

According to one or more embodiments of the present disclosure, the first-type interactive operation comprises an interactive operation for the target object or an interactive operation between users associated with the target object.

According to one or more embodiments of the present disclosure, in response to the first display mode in which the first interactive control is located within the display image region of the target object on the target object display interface, and the second display mode in which the second interactive control is located within the region other than the display image region of the target object on the target object display interface: in the first display mode, the first interactive control and the target object are displayed synchronously on the target object display interface; and in the second display mode, the second interactive control and the target object are displayed synchronously on the target object display interface, or the second interactive control is triggered and displayed on the target object display interface in a process of display of the target object.

According to one or more embodiments of the present disclosure, the display mode switching comprises any one of following operations: at least one touch point in a touch control region of the target object display interface being triggered and moving along a path; or a third interactive control on the target object display interface for display mode switching being triggered.

According to one or more embodiments of the present disclosure, in the second display mode, the target object display interface further comprises the first interactive control, the second display mode is a clear screen display mode, and in the second display mode, the first interactive control and the second interactive control are located within a region other than a display image region of the target object on the target object display interface.

According to one or more embodiments of the present disclosure, an interaction apparatus, comprising: a target object display unit, configured to display a target object in a first display mode on a target object display interface and display the target object in a second display mode on the target object display interface, wherein in the first display mode, the target object display interface comprises a first interactive control, and in the second display mode, the target object display interface comprises a second interactive control, the first interactive control being different from the second interactive control; an operation receiving unit, configured to receive a display mode switching on the target object display interface; and a display mode switching unit, configured to switch, in response to the display mode switching, from displaying the target object in the first display mode on the target object display interface to displaying the target object in the second display mode on the target object display interface.

According to one or more embodiments of the present disclosure, an electronic device, comprising: a processor; and a memory, comprising one or more computer-executable instructions, wherein the one or more computer-executable instructions are stored on the memory and configured to be executed by the processor, and the one or more computer-executable instructions are configured to implement the interaction method according to any one of the embodiments of the present disclosure.

According to one or more embodiments of the present disclosure, a storage medium, configured to store non-transitory computer-executable instructions, wherein the non-transitory computer-executable instructions, when executed by a processor, cause the processor to implement the interaction method according to any one of the embodiments of the present disclosure.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate subcombination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

For the present disclosure, the following statements should be noted.

(1) The accompanying drawings related to the embodiment(s) of the present disclosure involve only the structure(s) in connection with the embodiment(s) of the present disclosure, and other structure(s) can be referred to common design(s).

(2) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. Therefore, the protection scope of the present disclosure should be based on the protection scope of the claims.

The invention claimed is:

1. An interaction method, comprising:
   displaying a target object in a first display mode on a target object display interface, wherein in the first display mode, the target object display interface comprises a first interactive control, wherein the target object comprises a media resource posted by a user of an application, and the target object display interface is an interactive interface provided by the application;
   receiving a display mode switching on the target object display interface; and
   in response to the display mode switching, displaying the target object in a second display mode on the target object display interface, wherein in the second display mode, the target object display interface comprises a second interactive control different from the first interactive control.

2. The interaction method according to claim 1, wherein in response to the display mode switching, a display attribute of a display image region of the target object on the target object display interface remains unchanged.

3. The interaction method according to claim 2, wherein the display attribute of the display image region of the target object on the target object display interface remaining unchanged comprises at least one of following:
   a display scale of the display image region of the target object on the target object display interface remaining unchanged, or a display position of the display image region of the target object on the target object display interface remaining unchanged.

4. The interaction method according to claim 1, wherein in the first display mode, the first interactive control is located within a display image region of the target object on the target object display interface, and in the second display mode, the second interactive control is located within a region other than the display image region of the target object on the target object display interface; or
   in the first display mode, the first interactive control is located within the region other than the display image region of the target object on the target object display interface, and in the second display mode, the second interactive control is located within the display image region of the target object on the target object display interface.

5. The interaction method according to claim 4, wherein in response to the second display mode in which the second interactive control is located within the region other than the display image region of the target object on the target object display interface, the second display mode is a clear screen display mode; or
   in response to the first display mode in which the first interactive control is located within the region other than the display image region of the target object on the target object display interface, the first display mode is the clear screen display mode.

6. The interaction method according to claim 4, wherein, in the first display mode, if the first interactive control is located within the display image region of the target object on the target object display interface, the target object display interface further comprises data information of the target object, and the data information of the target object is located within the display image region of the target object on the target object display interface; or
   in the second display mode, if the second interactive control is located within the display image region of the target object on the target object display interface, the target object display interface further comprises data information of the target object, and the data information of the target object is located within the display image region of the target object on the target object display interface.

7. The interaction method according to claim 4, wherein the first interactive control is configured to perform a first-type interactive operation, and the second interactive control is configured to perform a second-type interactive operation, the first-type interactive operation being different from the second-type interactive operation.

8. The interaction method according to claim 7, wherein in response to the second display mode in which the second interactive control is located within the region other than the display image region of the target object on the target object display interface, the second-type interactive operation comprises an adjustable operation corresponding to display information in the second display mode.

9. The interaction method according to claim 8, wherein in response to the target object being a video, in the second display mode, the target object display interface further comprises at least one gesture interaction control region corresponding to the second display mode; and
   in response to the gesture interaction control region being triggered, a current state of the video is changed.

10. The interaction method according to claim 9, wherein the at least one gesture interaction control region comprises a first playing rate control region and a second playing rate control region;
    in response to the first playing rate control region being triggered, a current playing rate of the video is changed and adjusted to a first preset playing rate, and the first preset playing rate is a first multiple of the current playing rate of the video; and
    in response to the second playing rate control region being triggered, the current playing rate of the video is changed and adjusted to a second preset playing rate, and the second preset playing rate is a second multiple of the current playing rate of the video, the second multiple being different from the first multiple.

11. The interaction method according to claim 8, wherein the second-type interactive operation further comprises an obtaining operation corresponding to the display information in the second display mode.

12. The interaction method according to claim 11, wherein the obtaining operation comprises any one of following operations:
    storing the target object; or
    performing image capturing on the target object display interface to generate a screenshot comprising display information of the target object.

13. The interaction method according to claim 12, wherein the screenshot is a display image of the target object on the target object display interface.

14. The interaction method according to claim 8, wherein the first-type interactive operation comprises an interactive operation for the target object or an interactive operation between users associated with the target object.

15. The interaction method according to claim 4, wherein in response to the first display mode in which the first interactive control is located within the display image region of the target object on the target object display interface, and the second display mode in which the second interactive control is located within the region other than the display image region of the target object on the target object display interface:

in the first display mode, the first interactive control and the target object are displayed synchronously on the target object display interface; and in the second display mode, the second interactive control and the target object are displayed synchronously on the target object display interface, or the second interactive control is triggered and displayed on the target object display interface in a process of display of the target object.

16. The interaction method according to claim 1, wherein the display mode switching comprises any one of following operations:

at least one touch point in a touch control region of the target object display interface being triggered and moving along a path; or a third interactive control on the target object display interface for display mode switching being triggered.

17. The interaction method according to claim 1, wherein in the second display mode, the target object display interface further comprises the first interactive control, the second display mode is a clear screen display mode, and in the second display mode, the first interactive control and the second interactive control are located within a region other than a display image region of the target object on the target object display interface.

18. An electronic device, comprising:

a processor; and a memory, comprising one or more computer-executable instructions, wherein the one or more computer-executable instructions are stored on the memory and configured to be executed by the processor, and the one or more computer-executable instructions are configured to implement the interaction method according to claim 1.

19. An interaction apparatus, comprising:

a target object display unit, configured to display a target object in a first display mode on a target object display interface and display the target object in a second display mode on the target object display interface, wherein in the first display mode, the target object display interface comprises a first interactive control, and in the second display mode, the target object display interface comprises a second interactive control, the first interactive control being different from the second interactive control, wherein the target object comprises a media resource posted by a user of an application, and the target object display interface is an interactive interface provided by the application;

an operation receiving unit, configured to receive a display mode switching on the target object display interface; and a display mode switching unit, configured to switch, in response to the display mode switching, from displaying the target object in the first display mode on the target object display interface to displaying the target object in the second display mode on the target object display interface.

20. A storage medium, configured to store non-transitory computer-executable instructions, wherein the non-transitory computer-executable instructions, when executed by a processor, cause the processor to implement an interaction method, and the interaction method comprises:

displaying a target object in a first display mode on a target object display interface, wherein in the first display mode, the target object display interface comprises a first interactive control, wherein the target object comprises a media resource posted by a user of an application, and the target object display interface is an interactive interface provided by the application;

receiving a display mode switching on the target object display interface; and in response to the display mode switching, displaying the target object in a second display mode on the target object display interface, wherein in the second display mode, the target object display interface comprises a second interactive control different from the first interactive control.

* * * * *